United States Patent
Huang et al.

(10) Patent No.: US 10,628,400 B2
(45) Date of Patent: Apr. 21, 2020

(54) AUTOMATIC CONTENT TAGGING

(71) Applicant: Microsoft Technology Licensing, LLC, Redmond, WA (US)

(72) Inventors: Eric Huang, San Francisco, CA (US); David Golland, Oakland, CA (US); Patrick Chase, Portola Valley, CA (US); Alexandre Patry, Dublin, CA (US); Shakti Dhirendraji Sinha, Sunnyvale, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 125 days.

(21) Appl. No.: 15/252,691

(22) Filed: Aug. 31, 2016

(65) Prior Publication Data

US 2018/0052874 A1 Feb. 22, 2018

Related U.S. Application Data

(60) Provisional application No. 62/377,332, filed on Aug. 19, 2016.

(51) Int. Cl.
| | |
|---|---|
| *G06F 16/22* | (2019.01) |
| *G06F 16/23* | (2019.01) |
| *G06F 16/38* | (2019.01) |
| *G06F 16/35* | (2019.01) |

(52) U.S. Cl.
CPC .......... *G06F 16/22* (2019.01); *G06F 16/2379* (2019.01); *G06F 16/35* (2019.01); *G06F 16/38* (2019.01)

(58) Field of Classification Search
None
See application file for complete search history.

(56) References Cited

U.S. PATENT DOCUMENTS

| | | | |
|---|---|---|---|
| 2003/0212673 A1* | 11/2003 | Kadayam | G06F 17/30864 |
| 2005/0021490 A1* | 1/2005 | Chen | G06F 16/3347 |
| 2015/0286945 A1* | 10/2015 | Brewster | G06N 5/04 706/12 |
| 2016/0028659 A1* | 1/2016 | Jacobs | H04L 12/1859 709/206 |
| 2016/0103881 A1* | 4/2016 | Gukal | G06F 16/248 707/722 |
| 2016/0335339 A1* | 11/2016 | Venkataraman | G06F 17/30038 |

\* cited by examiner

*Primary Examiner* — Charles D Adams
(74) *Attorney, Agent, or Firm* — Schwegman Lundberg & Woessner, P.A.

(57) ABSTRACT

A system and method for automatic topic tagging are provided. In example embodiments, input content is received, the content includes a plurality of terms. Term vectors are generated from the plurality of terms. Candidate topics are identified to assigned to the plurality of terms. Topics are assigned to the received content from the identified candidate topics.

17 Claims, 6 Drawing Sheets

AUTOMATIC CONTENT TAGGING

CROSS-REFERENCE TO RELATED APPLICATIONS

This application claims the benefit of priority to Eric Huang et al. U.S. Provisional Patent Application Ser. No. 62/377,332, entitled "Automatic Content Tagging," filed on Aug. 19, 2016, which is hereby incorporated by reference herein in its entirety.

TECHNICAL FIELD

Embodiments of the present disclosure relate generally to data processing and, more particularly, but not by way of limitation, to automatic digital content tagging.

BACKGROUND

Content tagging is frequently utilized in a variety of databases, websites, and software algorithms for fast and efficient placement, usage, and searching of the content. Content tagging identifies and associates digital content with descriptors such as the types and categories to describe the content. Content tagging allows for the creation of metadata about the content and therefore is a key process for database organization and data structure. Content tagging also plays a key part in search engines, allowing for the filtering down and targeting of specific content. Often, content tagging relies on users to provide relevant tags to describe the content, which is a time consuming process that results in high error rates.

BRIEF DESCRIPTION OF THE DRAWINGS

Various ones of the appended drawings merely illustrate example embodiments of the present disclosure and cannot be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In example embodiments, systems and methods for automatically tagging input digital content are described. A tagging system is used to automatically tag digital content in real-time or near real-time. The tagging system receives input content from a social network system, the input content including a plurality of terms. The tagging system generates term vectors from the plurality of terms. A list of candidate topics is then identified from a large list available topics within the tagging system based on a comparison between the plurality of terms within the input content with a list of terms and corresponding topics within the tagging system. Based on the comparison, a list of candidate topics is identified. The list of candidate topics is narrowed to a specific list of topics to assign to the input content based on dot product operation between the list of candidate topics with a plurality of classifier coefficients (e.g., coefficients that have been determined to be the relative weight assigned to different terms). A plurality of topics are then assigned to the input content and stored as metadata associated with the input content. In some embodiments, the operations of generating term vectors, identifying candidate topics and assigning specific topics to the input content can be carried out in an asynchronous fashion using different computers or processors to facilitate the rate of tagging with a large volume of input content data.

Digital content can be in example form of new articles, blogs, emails, documents, or any other digital content. It is noted that that although an article is used as an example for show the tagging process, the tagging system is able to tag many other content including, but not limited to, images, videos, and the like. These other types of content can also be converted to its feature vector form. It is also noted that the source of the input content being from the social network system is one embodiment of the tagging system. It is appreciated that the source of the input content may be in the form of any kind of data source, where the content is organized into terms. For instance, the data source can be in example form of a news article site, text of Wikipeadia, emails, and the like.

Figure 1:
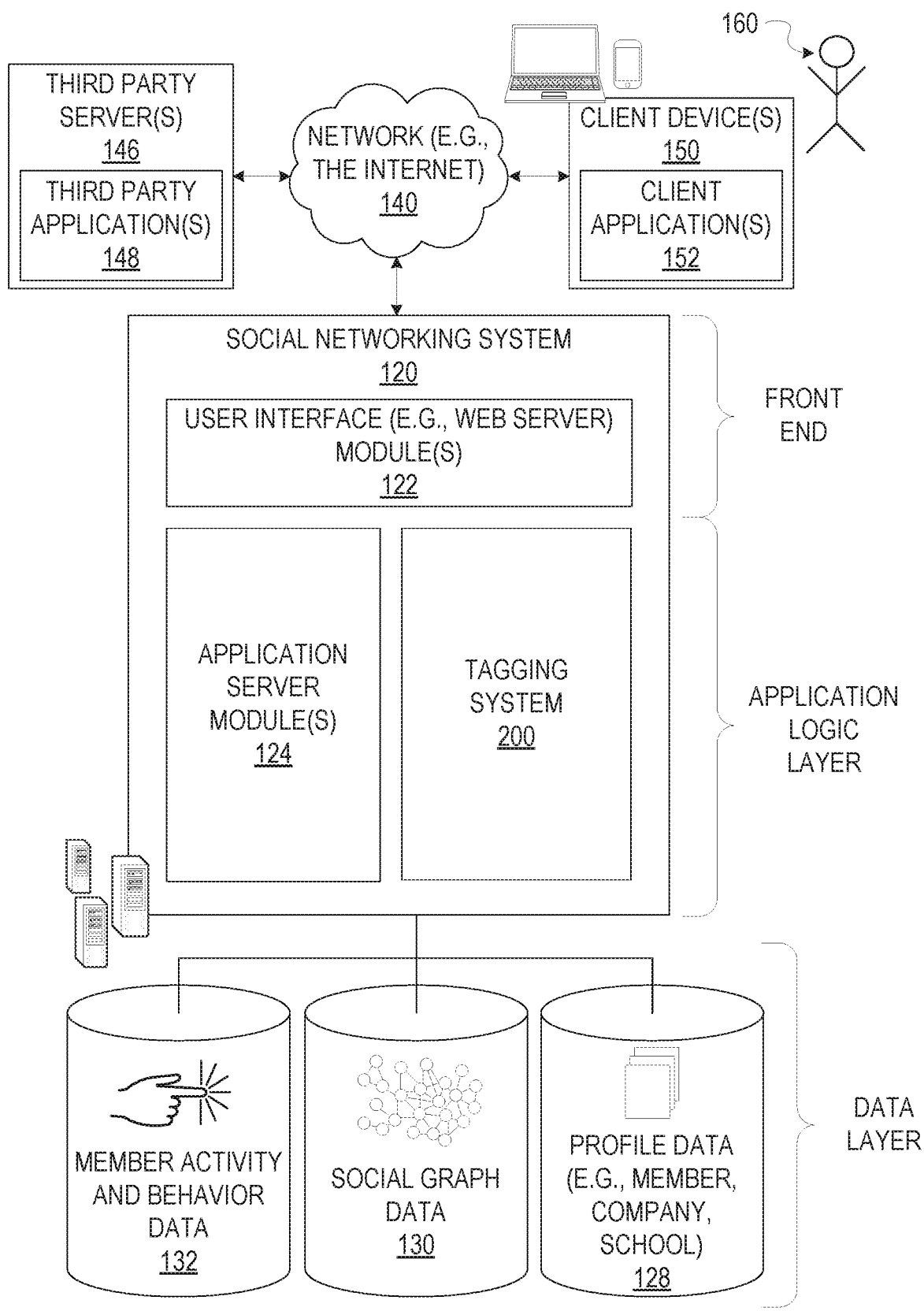
FIG. 1 is a network diagram depicting a client-server system within which various example embodiments may be deployed.

As shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such an architecture.

As shown in FIG. 1, the front end layer consists of a user interface module(s) (e.g., a web server) 122, which receives requests from various client-computing devices including one or more client device(s) 150, and communicates appropriate responses to the requesting device. For example, the user interface module(s) 122 may receive requests in the form of Hypertext Transport Protocol (HTTP) requests, or other web-based, Application Programming Interface (API) requests. The client device(s) 150 may be executing conventional web browser applications and/or applications (also referred to as "apps") that have been developed for a specific platform to include any of a wide variety of mobile computing devices and mobile-specific operating systems (e.g., iOS™, Android™, Windows® Phone). For example, client device(s) 150 may be executing client application(s) 152. The client application(s) 152 may provide functionality to present information to the user and communicate via the network 140 to exchange information with the social networking system 120. Each of the client devices 150 may comprise a computing device that includes at least a display and communication capabilities with the network 140 to access the social networking system 120. The client devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other means of interacting with the client device(s) 150. The user(s) 160 may interact with the social networking system 120 via the client device(s) 150. The user(s) 160 may not be part of the networked environment, but may be associated with client device(s) 150.

As shown in FIG. 1, the data layer includes several databases, including a database 128 for storing data for various entities of the social graph, including member profiles, company profiles, educational institution profiles, as well as information concerning various online or offline groups. Of course, with various alternative embodiments, any number of other entities might be included in the social graph, and as such, various other databases may be used to store data corresponding with other entities.

Consistent with some embodiments, when a person initially registers to become a member of the social networking service, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases.

As members interact with various applications, content, and user interfaces of the social networking system 120, information relating to the member's activity and behavior may be stored in a database, such as the database 132.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the social network service may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130.

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services and features of the social networking system 120. For instance, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124. Of course, other applications and services may be separately embodied in their own application server modules 124. As illustrated in FIG. 1, social networking system 120 may include a tagging system 200, which is described in more detail below.

Additionally, a third party application(s) 148, executing on a third party server(s) 146, is shown as being communicatively coupled to the social networking system 120 and the client device(s) 150. The third party server(s) 146 may support one or more features or functions on a website hosted by the third party.

Figure 2:
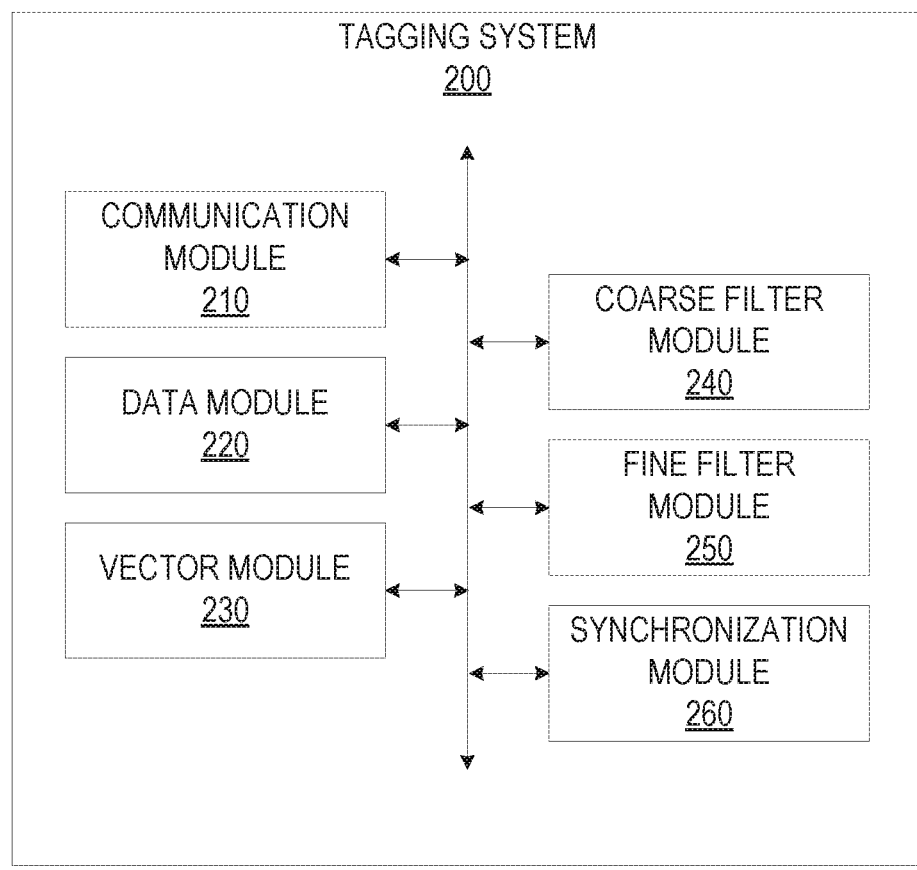
FIG. 2 is a block diagram illustrating a tagging system, according to some example embodiments.

FIG. 2 is a block diagram illustrating components provided within the tagging system 200, according to some example embodiments. The tagging system 200 includes a communication module 210, a data module 220, a vector module 230, a coarse filter module 240, a fine filter module 250, and a synchronization module 260. All, or some, of the modules are configured to communicate with each other, for example, via a network coupling, shared memory, a bus, a switch, and the like. It will be appreciated that each module may be implemented as a single module, combined into other modules, or further subdivided into multiple modules. Any one or more of the modules described herein may be implemented using hardware (e.g., a processor of a machine) or a combination of hardware and software. Other modules not pertinent to example embodiments may also be included, but are not shown.

The communication module 210 is configured to perform various communication functions to facilitate the functionality described herein. For example, the communication module 210 may communicate with the social networking system 120 using a wired or wireless connection. The communication module 210 may also provide various web services functions such as retrieving information from the third party servers 146 and other parts of the social networking system 120. In this way, the communication module 220 facilitates the communication between the tagging system 200 with the client devices 150 and the third party servers 146 via the network 140. Information retrieved by the communication module 210 may include profile data corresponding to the user 160, other members of the social network service, or other parts of the social networking system 120.

The data module 220 is configured to provide various data functionality such as accessing, exchanging, and storing information with databases or servers. For example, data module 220 may store and access input content from the social network system 120, coarse filter terms and corresponding topics, and fine classifier coefficients for the corresponding candidate topics identified by the coarse filter module 240. The fine classifier coefficients are generated using machine learning algorithm. Example machine learning algorithms include Linear Support Vector Machine (SVM), Radial Basis Function (RBF) SVM, Decision Tree, Random Forest, AdaBoost, Naïve Bayes, multi-class logistical regression model, and the like. The fine classifier coefficients are saved on respective databases and used to filter candidate topics. In some example embodiments, the data module 220 may exchange information with third party servers 146, client devices 150, and other sources of information.

The vector module 230 is configured to generate features from raw text within input content (e.g., such as an article) using vector space model. Natural language processing is used to segment the linear sequence strings of an entire article into terms using tokenization. The terms are used to generate term vectors, where the terms of the article are represented as vectors, the terms correspond to a non-zero vector. Details regarding term vector representation are described in detail in associated with FIG. 3.

The coarse filter module 240 is configured to identify candidate topics to assign to the input content. The coarse filter module 240 down-selects by eliminating topics from the large list of possible topics that do not apply to the input content through a process of coarse filtering. In this way, the coarse filter module 240 allows for real time near real time identification of candidate topics by requiring less computational heavy processing by eliminating and down-selecting topics within a large list of possible topics for content tagging. Details regarding candidate topic identification are described in detail in associated with FIG. 3 and FIG. 4.

The fine filter module 250 is configured to determine specific topics to assign to the input content. From the list of candidate topics identified by the coarse filter module 240, the fine filter module 250 identifies the specific topics to assign to the input content based on a plurality of classifier coefficients. Classifier coefficients signify relative weights assigned to different word terms. Each topic has set of thousands of classifier coefficients determined by a machine learning module within the social networking system 120 and accessed by the fine filter module 250 to determine whether to assign a candidate topic to the input content. The fine filter module 250 performs a dot product operation between the term vectors of the candidate topics (e.g., term vectors generated from input content corresponding to candidate topics) and the classifier coefficients, resulting in a single numerical number for each candidate topic. Where the result of the dot product transgresses a predetermined threshold, the candidate topic is approved to be assigned to the input content. Where the result of the dot product is below the predetermined threshold, the candidate topic is rejected as a topic to be assigned to the input content. Details regarding determining specific topics to assign to an input content are described in detail in associated with FIG. 3.

The synchronization module 260 is configured to determine whether topic tagging for a specific input content is finished. The candidate topics determined by the coarse filter module 240 are sent to the synchronization module 260 in order to determine when the tagging of the input content is finished for each input content. Each candidate topic is given a binary determination of a yes or no assignment by the fine filter module 250 asynchronously (e.g., the dot product measured above a predetermined threshold), and therefore the synchronization module 260 waits for the determination by the fine filter module 250 for all candidate topics identified by the coarse filter module 240 before synchronizing the topic assignment results for a single input content. It is noted that multiple processors and multiple computers may handle the determination of whether the candidate topic is to be assigned to the input content. Each determination for each candidate topic can occur at different computers or different processors and therefore the results for a single input content are synchronized by the synchronization module 260. Details regarding synchronizing the topic tagging process are described in detail in associated with FIG. 3.

Figure 3:
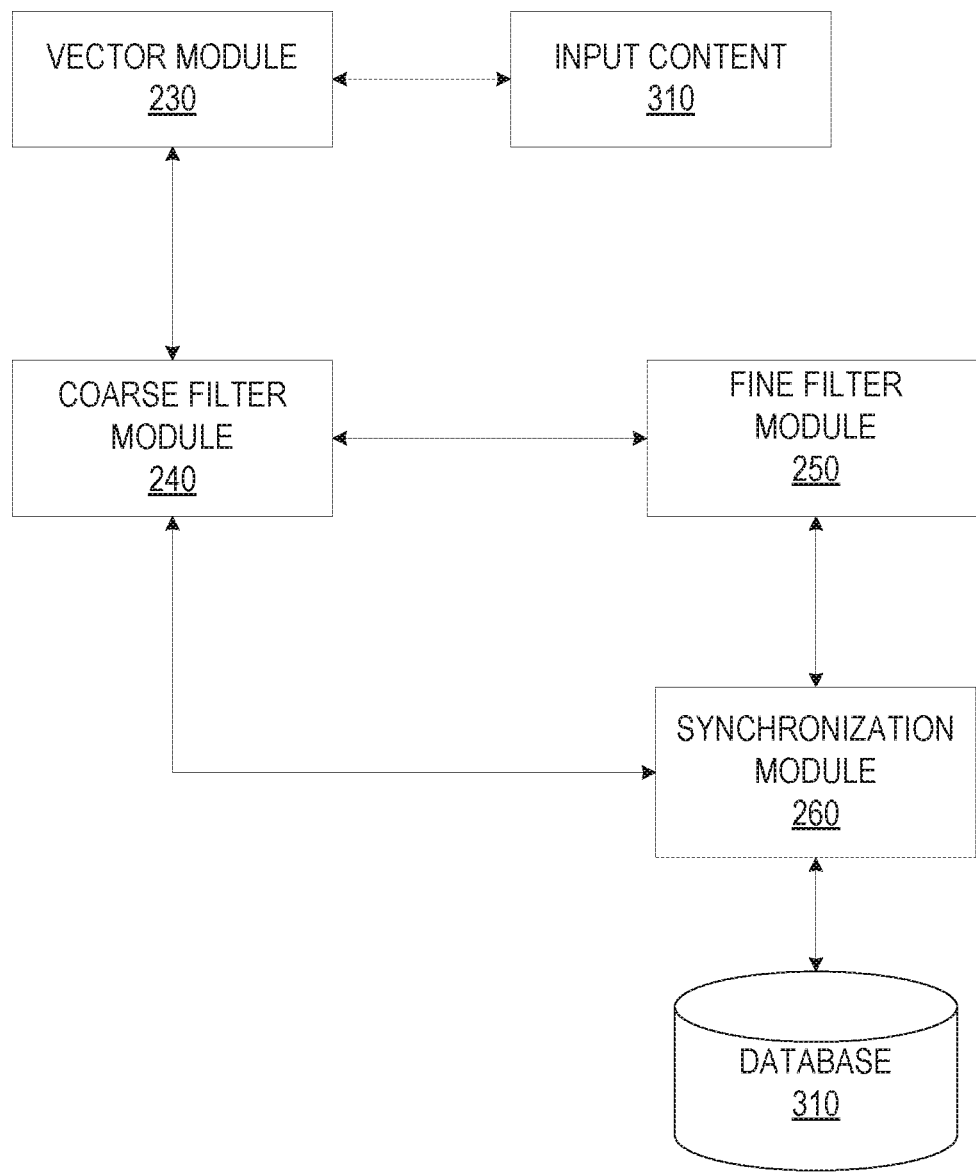
FIG. 3 is a block diagram illustrating an information flow for automatic content tagging, according to some example embodiments.

FIG. 3 is a block diagram illustrating an example information flow for automatic content tagging. The input content 310 can be in example form of a news article, blog, document, and the like, the input content comprising of a plurality of terms. Terms used herein refers to textual words which can be in the form raw text or represented as term vectors. Input content 310 is converted into its vector form by the vector module 230 using vector space model, generating term vectors, where a single input content corresponds to a vector, and each term corresponds to a dimension in the single vector. Each vector includes an entry for every term in a document, the vector having direction and magnitude. In one embodiment, a document, D, is represented by a vector as follows: $D = \{t_1, t_2, t_3, t_4 \ldots, t_N\}$, where t is a term of the document, and N is the size of the document. Each term may also be assigned different weights. The coarse filter module 240 uses the term vectors to identify candidate topics to assign to the input content 310.

The coarse filter module 240 identifies candidate topics to assign to the input content by comparing the term vectors of the input content with a plurality of coarse filter terms accessed from a database. The coarse filter terms can be in the form of a list of existing coarse filter terms, where each coarse filter term corresponds to a plurality of candidate topics. For each term vector that matches with a coarse filter term, a frequency count is incremented for each of the candidate topics that correspond to the coarse filter term. The coarse filter module 240 iterates through the list of term vectors of the input module and assigns a frequency count to each candidate topics that corresponds to the coarse filter term that matches to the term vector. Candidate topics are ranked according to the total frequency count for the corresponding candidate topic. Candidate topics that transgresses above a frequency threshold (e.g., a predetermined threshold that indicates a high likelihood the topic should be assigned to the input content) are identified as a candidate topic. In other words, the top n-ranked candidate topics (e.g., ranked based on the frequency count) are chosen as candidate topics for further filtering in the fine filter module 250. In other embodiments, each candidate topic has its own threshold, the threshold may be different between candidate topics. If the frequency count exceeds the threshold for that particular candidate topic, the particular candidate topic is a candidate topic for further filtering by the fine filter module 250. In other words, the output of the coarse filter module 240 is a set of candidate topics whose individual threshold has been satisfied. Details regarding candidate topic identification are described in detail in associated with FIG. 4.

The fine filter module 250 assigns topics to the input content from the list of candidate topics identified by the coarse filter module 240 by determining specifically which topics to best assign to the input content. The fine filter module 240 uses classifier coefficients to determine which topics to best assign to the input content. The classifier coefficients signify relative weights assigned to different topics, where each topic has set of tens to hundreds of thousands of classifier coefficients being determined by a machine learning algorithm within the social networking system 120 and accessed by the fine filter module 250. The fine filter module 250 performs a dot product operation between the term vectors of candidate topics (e.g., term vectors of the input content corresponding to the candidate topics) and the classifier coefficients. The fine filter module 250 compares the results of the dot product to a predetermined threshold. Where the result of the dot product transgresses a predetermined threshold, the candidate topic is approved to be assigned to the input content. In other words, term vector of the input content that corresponds to topics selected by the source filter module 240 are multiplied by their corresponding classifier coefficients. Where the product is greather than a threshold, metadata is generated assigned the topic to the input content.

In various embodiments, the dot product operation includes computing the number of non-zeros of a multiplication between two term vectors, the first term vector being the term vector that correspond to the candidate topic, the second term vector being a dynamic index map that maps a string to an integer index, resulting in a first vector result, R1. For example, the first vector is calculated from a dot product of term vector, V, and dynamic index map, M. In one embodiment, a vector, V, is represented as follows: V={t1, t2, t3 . . . tN}, where t1, t2, t3 . . . tN are candidate topics.

The dot product operation further includes a logistic link operation (e.g., logit transformation in a logistic regression) that applies a dot product map of the index map, M, to the classifier coefficients, resulting in a second vector result, R2. In this way, the two data sources of term vectors that correspond to the candidate topic and classifier coefficients use the same index map, M, and thus enabling the dot product operation between the two different data sources. The dot product between V and M, and classifier coefficients and M allow for the data sources of V and classifier coefficients to be declared with the same section type and thus enable a dot product operation between V and the classifier coefficients. Where the two data source of the classifier coefficients and candidate topic term vectors are the same type, then they do not require the index map. Rather, a dot product is simply performed without the normalizing steps introduced by the index map.

A dot product is then performed between the first vector, R1, and the second vector, R2. The fine filter module 250 declares the topic to apply where the result of the dot product transgresses a threshold. In an example, the threshold can be set to where the number of non-zeros in the dot product is at least 50 and the log score is at least 0.5. The dot product result is used to rank the topics in relevant order. In some embodiments, the top n-number of topics are chosen to be assigned to the input content, since in some instances it is not desirable to assign too many topics to a single input content.

The synchronization module 260 assembles the results of the fine filtering module 250, assigns the topic to the input content, and stores the result in database 330. In various embodiments, splitting the candidate topic identification and assignment process between different computers and processors within the coarse filter module 240 and fine filter module 250 in an asynchronous process facilitates the topic identification and assignment for a large amount of input content, while maintaining a high rate of topic tagging. Splitting the process between the coarse filtering and fine filtering reduces the amount of processing power required by limiting the amount of topics required for the fine filter module 240 to processes due to the relative computational heavy requirements of the operations performed by the fine filter module 240. As a result, the operations of the vector module 230 may be performed by different computers and processors for each article during the vector conversion process. Reducing the computational heavy requirements comes at the expense of communication bandwidth between the coarse filtering processors and fine filtering processors of the coarse filter module 240 and fine filter module 250. As a result, a hybrid architecture addresses the communication bandwidth drawback by having a single computer process operations of the coarse filter module 240 and fine filter module 250.

In various embodiments, different candidate topics may be processed by different computers or processors during the fine filtering process executed by fine filter module 250 since each term has a corresponding set of classifier coefficients pre-cached in the computer memory. Each input content corresponds to one term vector, where copies of the term vector is assigned to different computers, each of which has a different set of fine classifier coefficient. This approach alleviates the problem of memory allocation requirement for the computational heavy process of topic tagging by the fine filter module 250. The operations of the fine filtering are distributed horizontally such as each computer machine only need to hold a small amount of the classifier coefficients within its memory. A computer or processor is identified for each corresponding candidate topic ID, where the computer or processor has the corresponding classifier coefficient for further processing. Thus, each computer may process each topic in an asynchronous fashion and later the results are combined for a single input content. The synchronization 260 receives the complete list of potential candidate topics to be decided by the fine filter module 250, and therefore awaits the results for each topic determination for approval or rejection and assembles the results for each input content.

In other embodiments, in a hybrid architecture, operations of the coarse filter module 240 and fine filter module 250 are processed by a single computer, thus eliminating the communication bandwidth drawback when the fine filtering process and coarse filtering process are performed by different computers. Within a hybrid architecture, there are multiple computers, each computer have redundant replicas of the same coarse filter module 240 operations but different classifier coefficients for corresponding candidate topics for the fine filtering operations. For instance, when an input content enters the tagging system 200, the content is broadcasted to all computers, each computer having the same operations performed by the coarse filter module 240, generating the same set of candidate topics in each computer. Each computer performs operations by the fine filter module 250 for only the candidate topics that have corresponding set of fine classifier coefficients. The result is a partial set of topic assignment from each computer, and subsequently joined to represent a complete topic assignment for an input content. As a result, the hybrid architecture increases communication between the coarse filtering and the filtering process, allows more resiliency to failure since there are redundancies in the coarse filtering process.

In some embodiments, where a topic is trending and thus the system receives a large amount of input content for a particular trending topic, a load balancer is used to distribute the classifier coefficients to other available machines to handle a large amount of influx of a specific topic within all the incoming input content. The load balancer determines which machines have available bandwidth to handle the coarse filtering and fine filtering processes as described in the coarse filter module 240 and fine filter module 250. These available machines may be on standby or machines allocated with handling other topic assignments, where these other topics currently have low volume input and thus leaving the machines with readily available bandwidth. For the machines determined to have available bandwidth, the load balancer uploads the classifier coefficients for the corresponding high volume trending topic where the machines proceed with determining whether to assign a topic ID to an input content.

Figure 4:
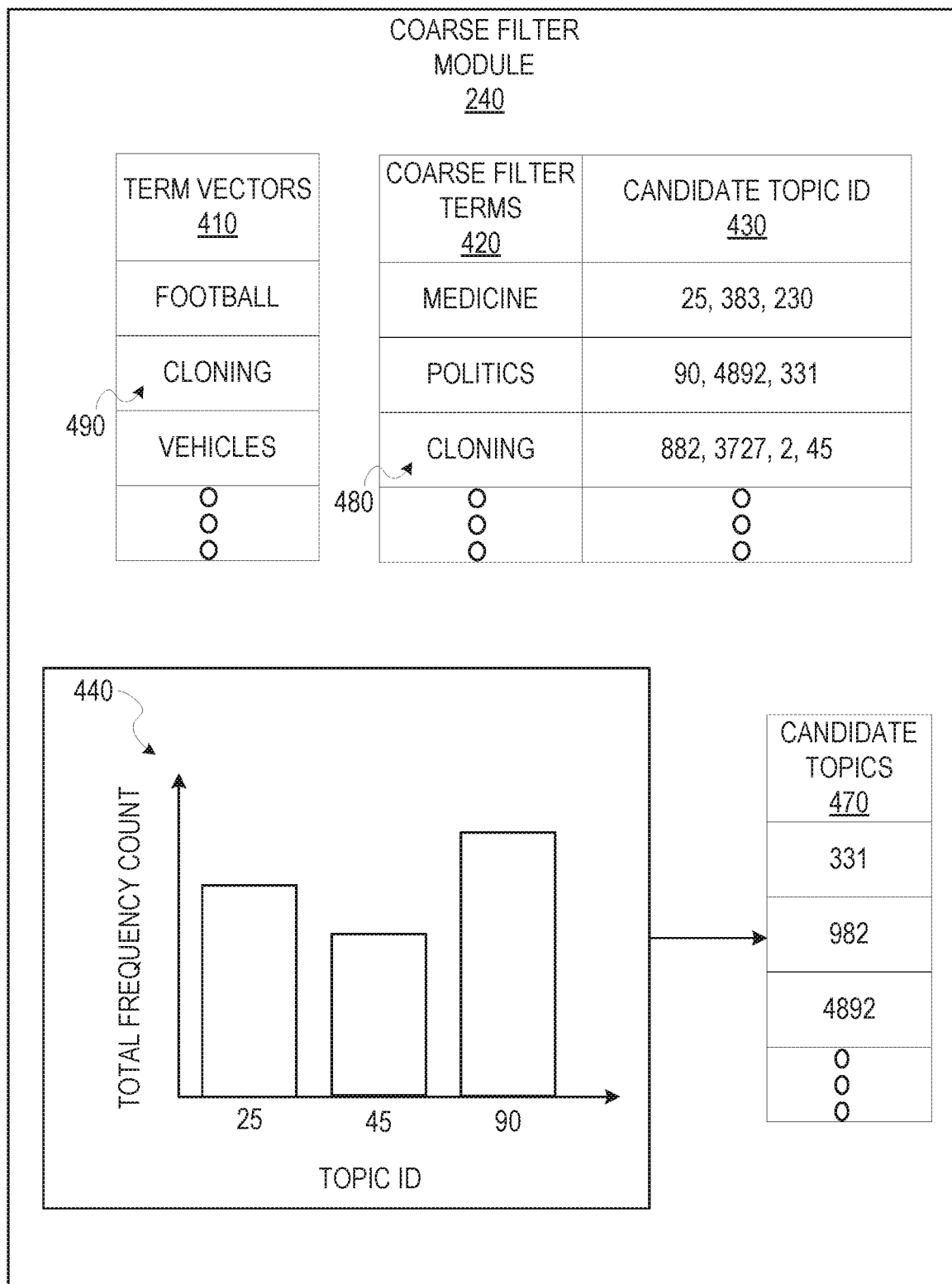
FIG. 4 is a block diagram illustrating a candidate topic identification, according to some example embodiments.

FIG. 4 is a block diagram illustrating an example of candidate topic identification performed by the coarse filter module 240. The term vectors 410 generated by the vector module 230 is used to compare with a plurality of coarse filter terms 420. The plurality of coarse filter terms 420 is accessed from a database and where each coarse filter term corresponds to a plurality of candidate topics ID 430. For instance, the coarse filter term cloning 480 corresponds to candidate topics with ID assignments 882, 3727, 2, and 45. In one example, the term vector cloning 490 is compared with coarse filter term cloning 480, and is identified as a match. For this match, a frequency count is given to each of the corresponding candidate topic ID 882, 3727, 2, and 45. For instance, candidate topic ID 882 has one count, candidate topic ID 3727 has one count, candidate topic ID 2 has one count, and candidate topic ID 45 has one count for the identified match between term vector cloning 490 and coarse filter term cloning 480. The coarse filter module 240 iterates through the list of term vectors 410 and a total frequency count is given to all candidate topic IDs in one illustration, bar graph 440 provides an example of a total frequency count where the x-axis is the topic ID, and the corresponding y-axis is the total frequency count of the topic ID. In the bar graph 440, the illustration shows the total frequency count for topic ID 25, 45, and 90. All candidate topics that transgresses above a frequency threshold (e.g., a predetermined threshold that indicates a high likelihood the topic should be assigned to the input content) is identified to be a candidate topic. As shown in candidate topics 470, the candidate topics are ranked according to their total frequency count. In this instance, the candidate topic ID 331 has a higher total frequency count than candidate topic ID 982 which in turn has a higher total frequency count than candidate topic ID 4892. The candidate topics that have a total frequency count above respective frequency threshold are identified by the coarse filter module 240 as a candidate topic for further fine filtering by the fine filter module 250. Each candidate topic has its own and possibly different threshold.

Figure 5:
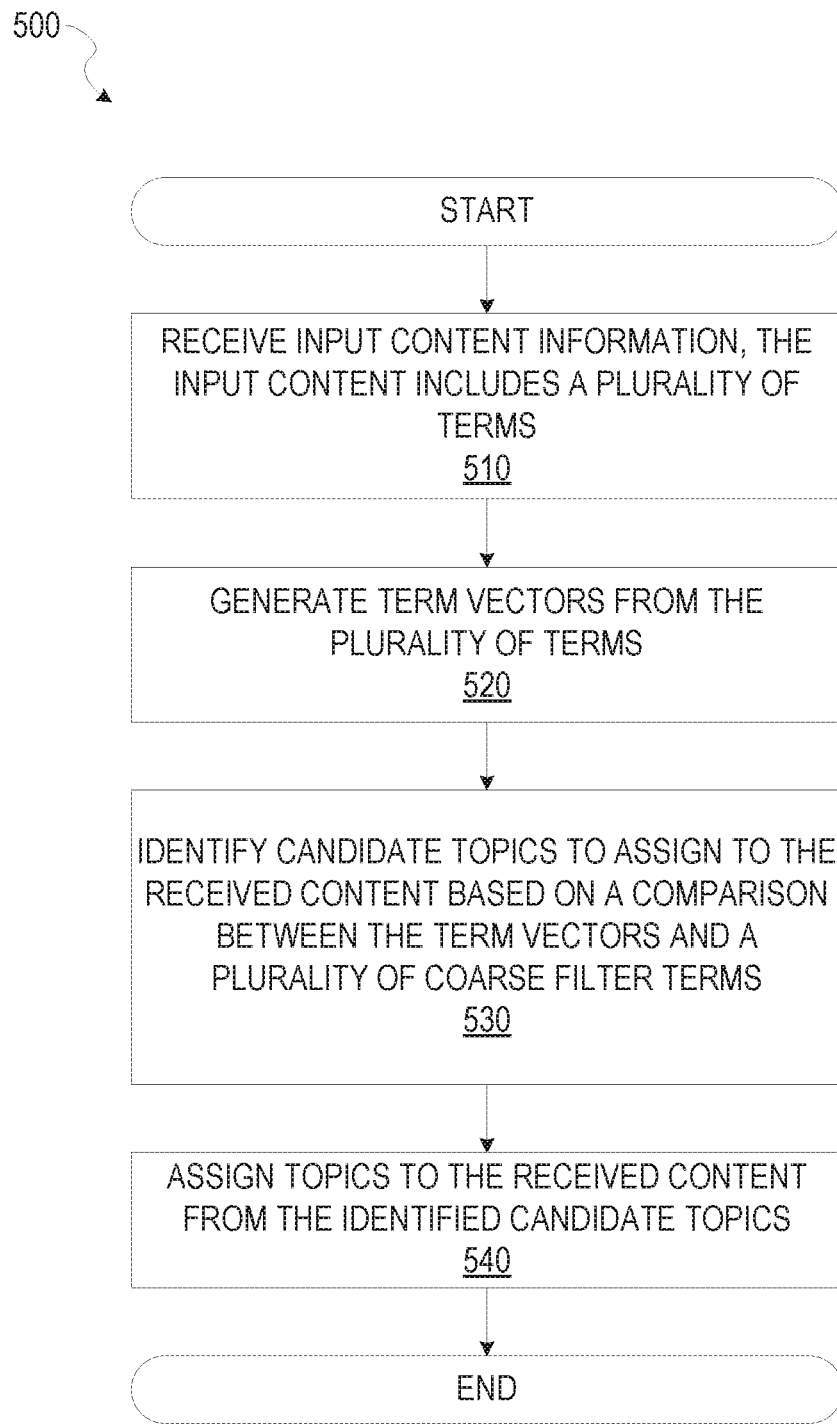
FIG. 5 is a flow diagram illustrating a method for automatic content tagging, according to example embodiments.

FIG. 5 is a flow diagram illustrating an example method 500 for automatic content tagging, according to example embodiments. The operations of the method 500 may be performed by components of the tagging system 200. At operation 510, the system receives input content information, the input content includes a plurality of terms. In an example embodiment, the input content is in the form of raw text, such as text from a webpage article, and each term corresponds to a word within the webpage article.

At operation 520, the plurality of terms are used to generate term vectors using vector space model by the vector module 240. The vector module 240 represents a text document in vector form, where each term is represented by a vector. The process includes parsing the content into single terms (e.g., tokenization process), and breaking each term into the root word (e.g., stemming process). The root words are then used for vector representation.

At operation 530, the coarse filter module 240 identifies candidate topics to assign to the received content based on a comparison between the term vectors and a plurality of coarse filter terms. Each of the plurality of coarse filter terms corresponds to a plurality of candidate topics. The comparison is based on calculating the frequency count for the plurality of candidate topics identified for all term vectors of the content. The identifying candidate topics is further based on the frequency count for the plurality of candidate topics transgressing respective frequency threshold. Details regarding candidate topic identification are described in detail in associated with FIG. 3 and FIG. 4.

At operation 540, the fine filter module 250 generates metadata that assigns topics to the received content from the identified candidate topics based on a dot product operation between classifier coefficients and the term vectors corresponding to the identified candidate topics. The assigning topics to the received content is further based on determining a dot product result that transgresses a threshold. The determination whether the dot product result of a topic transgresses a threshold is performed asynchronously. The classifier coefficients represent weight assigned to the plurality of terms. The assigning topics includes updating a database to identify the content to correspond to the assigned topics. The database may include metadata that includes the identifiers of the assigned topics for the corresponding content. In other embodiments, the assigning topics includes generating an identifier to identify the assigned topics that correspond to the content within the database, in response to determining that the content is a new content and does not have pre-existing assigned topics. Details regarding determining specific topics to assign to an input content are described in detail in associated with FIG. 3.

Figure 6:
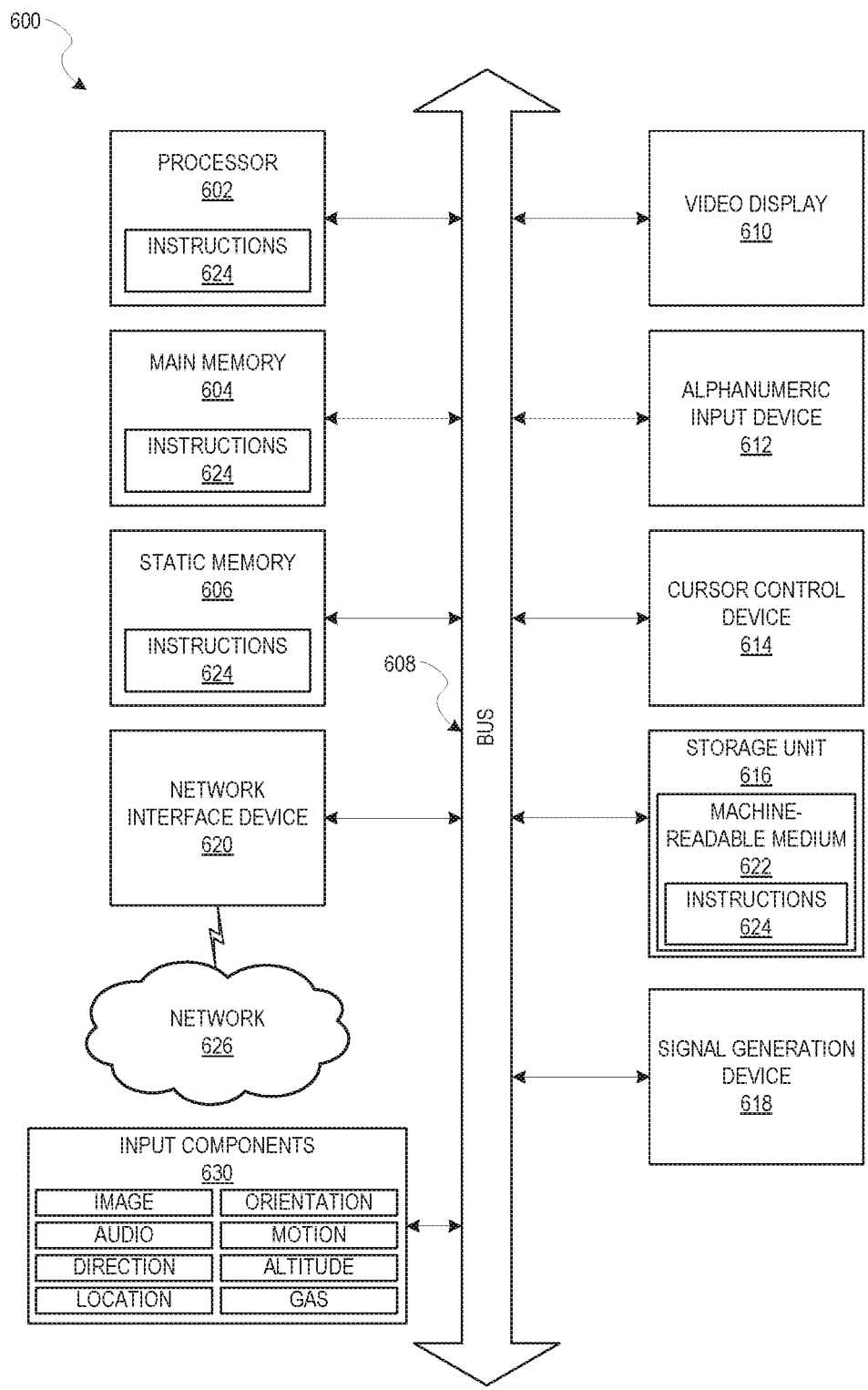
FIG. 6 illustrates a diagrammatic representation of a machine in the form of a computer system within which a set of instructions may be executed for causing the machine to perform any one or more of the methodologies discussed herein, according to example embodiments.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 624 (e.g., software, a program, an application, an applet, an app, or other executable code) for causing the machine 600 to perform any one or more of the methodologies, associated with the tagging system 200, discussed herein may be executed. In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624, sequentially or otherwise, that specify actions to be taken by that machine. Any of these machines can execute the operations associated with the tagging system 200. Further, while only a single machine 600 is illustrated, the term "machine" shall also be taken to include a collection of machines 600 that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RTIC), or any suitable combination thereof), a main memory 604, and a static memory 606, which are configured to communicate with each other via a bus 608. The machine 600 may further include a video display 610 (e.g., a plasma display panel (PDP), a light emitting diode (LEI)) display, a liquid crystal display (LCD), a projector, or a cathode ray tube (CRT)). The machine 600 may also include an alphanumeric input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a speaker), and a network interface device 620.

The storage unit 616 includes a machine-readable medium 622 on which is stored the instructions 624 embodying any one or more of the methodologies or functions described herein. The instructions 624 may also reside, completely or at least partially, within the main memory 604, within the static memory 606, within the processor 602 (e.g., within the processor's cache memory), or all three, during execution thereof by the machine 600. Accordingly, the main memory 604, static memory 606 and the processor 602 may be considered as machine-readable media 622. The instructions 624 may be transmitted or received over a network 626 via the network interface device 620.

In some example embodiments, the machine 600 may be a portable computing device, such as a smart phone or tablet computer, and have one or more additional input components 630 (e.g., sensors or gauges). Examples of such input components 630 include an image input component (e.g., one or more cameras, an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 622 able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions 624 The term "machine-readable medium" shall also be taken to include any medium, or combination of multiple media, that is capable of storing instructions (e.g., instruction 624) for execution by a machine (e.g., machine 600), such that the instructions, when executed by one or more processors of the machine 600 (e.g., processor 602), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. The term "machine-readable medium" specifically excludes non-statutory signals per se.

Furthermore, the machine-readable medium 622 is non-transitory in that it does not embody a propagating signal. However, labeling the machine-readable medium 622 as "non-transitory" should not be construed to mean that the medium is incapable of movement; the medium should be considered as being transportable from one physical location to another. Additionally, since the machine-readable medium 622 is tangible, the medium may be considered to be a machine-readable device.

The instructions 624 may further be transmitted or received over a communications network 626 using a transmission medium via the network interface device 620 and utilizing any one of a number of well-known transfer protocols (e.g., hypertext transfer protocol (HTTP)). Examples of communication networks include a local area network (LAN), a wide area network (WAN), the Internet, mobile telephone networks (e.g. 3GPP, 4G LTE, 3GPP2, GSM, UMTS/HSPA, WiMAX, and others defined by various standard setting organizations), plain old telephone service (POTS) networks, and wireless data networks (e.g., WiFi and BlueTooth networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 622 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor 602, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 602 that are temporarily configured (e.g., by software) or permanently configured to perform the relevant operations. Whether temporarily or permanently configured, such processors 602 may constitute processor-implemented modules that operate to perform one or more operations or functions described herein. As used herein, "processor-implemented module" refers to a hardware module implemented using one or more processors 602.

Similarly, the methods described herein may be at least partially processor-implemented, with a processor 602 being an example of hardware. For example, at least some of the operations of a method may be performed by one or more processors 602 or processor-implemented modules. Moreover, the one or more processors 602 may also operate to support performance of the relevant operations in a "cloud computing" environment or as a "software as a service" (SaaS). For example, at least some of the operations may be performed by a group of computers (as examples of machines 600 including processors 602), with these operations being accessible via the network 626 (e.g., the Internet) and via one or more appropriate interfaces (e.g., an application program interface (API)).

The performance of certain of the operations may be distributed among the one or more processors 602, not only residing within a single machine 600, but deployed across a number of machines 600. In some example embodiments, the one or more processors 602 or processor-implemented modules may be located in a single geographic location (e.g., within a home environment, an office environment, or a server farm). In other example embodiments, the one or more processors 602 or processor-implemented modules may be distributed across a number of geographic locations.

Although an overview of the inventive subject flatter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
a processor, and a memory including instructions, which when executed by the processor, cause the processor to:
receive content information that include a plurality of terms;
generate term vectors from the plurality of terms;
compare the term vectors to a plurality of coarse filter terms to eliminate one or more coarse filter terms that do not apply to any of the term vectors, wherein each coarse filter term has a separate predetermined threshold, resulting in a matching set of coarse filter terms, wherein the comparing includes incrementing a frequency count associated with each course filter term in the plurality of coarse filter terms for each appearance of the corresponding coarse filter term in the term vectors and eliminating, for each of the plurality of coarse filter terms, any coarse filter term with a frequency count less than the predetermined threshold assigned to the corresponding coarse filter term from the matching set of coarse filter terms;
access a stored mapping data structure that maps each of one or more coarse filter terms to a plurality of candidate topic identifications to identify candidate topic identifications for the matching set of coarse filter terms;
identify a result set of candidate topics based on classifier coefficients assigning different weights to different word terms, the classifier coefficients learned by a machine learning algorithm;
reject one or more candidate topics in the result set of candidate topics based on a dot product operation between the classifier coefficients and the term vectors corresponding to the identified candidate topics;
generate metadata identifying each non-rejected topic in the result set of candidate topics;
tag the content information with the generated metadata, wherein the tagging involves storing the generated metadata with the content information in such a way as to facilitate searching for the content information based on the generated metadata.

2. The system of claim 1, wherein:
each of the plurality of coarse filter terms corresponds to a plurality of candidate topics.

3. The system of claim 2, wherein:
the comparison is based on calculating the frequency count for the plurality of candidate topics identified for term vectors of the content.

4. The system of claim 3, wherein:
the identifying candidate topics is further based on the frequency count for the plurality of candidate topics transgressing respective frequency threshold.

5. The system of claim 1, wherein:
the rejecting is further based on determining a dot product result that transgresses a threshold.

6. The system of claim 5, wherein:
the determination whether the dot product result of a topic transgresses a threshold is performed asynchronously.

7. The system of claim 1, wherein:
the classifier coefficients represent weight assigned to the plurality of terms.

8. A method comprising:
using one or more computer processors:
receiving content information that include a plurality of terms;
generating term vectors from the plurality of terms;
comparing the term vectors to a plurality of coarse filter terms to eliminate one or more coarse filter terms that do not apply to any of the term vectors, wherein each coarse filter term has a separate predetermined threshold, resulting in a matching set of coarse filter terms, wherein the comparing includes incrementing a frequency count associated with each course filter term in the plurality of coarse filter terms for each appearance of the corresponding coarse filter term in the term vectors and eliminating, for each of the plurality of coarse filter terms, any coarse filter term with a frequency count less than the predetermined threshold assigned to the corresponding coarse filter term from the matching set of coarse filter terms;
accessing a stored mapping data structure that maps each of one or more coarse filter terms to a plurality of candidate topic identifications to identify candidate topic identifications for the matching set of coarse filter terms;
identifying a result set of candidate topics based on classifier coefficients assigning different weights to different word terms, the classifier coefficients learned by a machine learning algorithm;
Rejecting one or more candidate topics in the result set of candidate topics based on a dot product operation between the classifier coefficients and the term vectors corresponding to the identified candidate topics;
generating metadata identifying each non-rejected topic in the result set of candidate topics;
tagging the content information with the generated metadata, wherein the tagging involves storing the generated metadata with the content information in such a way as to facilitate searching for the content information based on the generated metadata.

9. The method of claim 8, wherein:
each of the plurality of coarse filter terms corresponds to a plurality of candidate topics.

10. The method of claim 9, wherein:
the comparison is based on calculating the frequency count for the plurality of candidate topics identified for all term vectors of the content.

11. The method of claim 10, wherein:
the identifying candidate topics is further based on the frequency count for the plurality of candidate topics transgressing respective frequency threshold.

12. The method of claim 8, wherein:
the rejecting is further based on determining a dot product result that transgresses a threshold.

13. The method of claim 12, wherein:
the determination whether the dot product result of a topic transgresses a threshold is performed asynchronously.

14. The method of claim 8, further comprising:
the classifier coefficients represent weight assigned to the plurality of terms.

15. A machine-readable medium not having any transitory signals and storing instructions that, when executed by at least one processor of a machine, cause the machine to perform operations comprising:
using one or more computer processors:
receiving content information that include a plurality of terms;
generating term vectors from the plurality of terms;
comparing the term vectors to a plurality of coarse filter terms to eliminate one or more coarse filter terms that do not apply to any of the term vectors, wherein each coarse filter term has a separate predetermined threshold, resulting in a matching set of coarse filter terms, wherein the comparing includes incrementing a frequency count associated with each course filter term in the plurality of coarse filter terms for each appearance of the corresponding coarse filter term in the term vectors and eliminating, for each of the plurality of coarse filter terms, any coarse filter term with a frequency count less than the predetermined threshold assigned to the corresponding coarse filter term from the matching set of coarse filter terms;
accessing a stored mapping data structure that maps each of one or more coarse filter terms to a plurality of candidate topic identifications to identify candidate topic identifications for the matching set of coarse filter terms;
identifying a result set of candidate topics based on classifier coefficients assigning different weights to different word terms, the classifier coefficients learned by a machine learning algorithm;
Rejecting one or more candidate topics in the result set of candidate topics based on a dot product operation between the classifier coefficients and the term vectors corresponding to the identified candidate topics;
generating metadata identifying each non-rejected topic in the result set of candidate topics;
tagging the content information with the generated metadata, wherein the tagging involves storing the generated metadata with the content information in such a way as to facilitate searching for the content information based on the generated metadata.

16. The machine-readable medium of claim 15, wherein:
each of the plurality of coarse filter terms corresponds to a plurality of candidate topics;
wherein the comparison is based on calculating the frequency count for the plurality of candidate topics identified for all term vectors of the content; and
wherein the identifying candidate topics is further based on the frequency count for the plurality of candidate topics transgressing respective frequency threshold.

17. The machine-readable medium of claim 15, wherein:
the rejecting is further based on determining a dot product result that transgresses a threshold; and
the determination whether the dot product result of a topic transgresses a threshold is performed asynchronously.

* * * * *